United States Patent [19]

Kurihara et al.

[11] Patent Number: 5,050,714
[45] Date of Patent: Sep. 24, 1991

[54] SYSTEM AND METHOD FOR CONTROLLING VEHICLE DRIVE-OFF

[75] Inventors: Kazumasa Kurihara; Shigeru Yajima, both of Higashimatsuyama, Japan

[73] Assignee: Diesel Kiki Co., Ltd., Tokyo, Japan

[21] Appl. No.: 449,267

[22] Filed: Dec. 12, 1989

[30] Foreign Application Priority Data

Dec. 15, 1988 [JP] Japan .................. 63-314977

[51] Int. Cl.$^5$ .......................................... B60K 41/02
[52] U.S. Cl. ........................... 192/0.032; 192/0.076; 192/0.096; 192/103 R; 364/424.1
[58] Field of Search ............... 192/0.032, 0.033, 0.076, 192/0.096, 103 R; 364/424.1

[56] References Cited

U.S. PATENT DOCUMENTS

| | | | |
|---|---|---|---|
| 4,295,551 | 10/1981 | Zimmermann et al. | 192/0.076 |
| 4,618,043 | 10/1986 | Hattori et al. | 192/0.076 X |
| 4,632,231 | 12/1986 | Hattari et al. | 192/0.076 |
| 4,685,062 | 8/1987 | Uriuhara et al. | 364/424.1 |
| 4,714,145 | 12/1987 | Karihara et al. | 192/0.076 X |

Primary Examiner—Richard Lorence
Attorney, Agent, or Firm—Pollock, Vande Sande & Priddy

[57] ABSTRACT

In a control system for controlling a clutch coupled with an internal combustion engine for driving a vehicle off, the control operation for clutch engagement is carried out based on the level of power insufficiency of the engine. When the level of engine insufficiency is within a predetermined range, the operation for clutch engagement is controlled in accordance with the change in the amount of operation of an accelerating member without stopping the engaging operation of the clutch. In order to improve the performance experienced by the operator at drive-off, just after recovery from power insufficiency, the target clutch stroke to be followed is corrected by correction data determined on the basis of the difference between the target and actual clutch stroke at the time the engine has just recovered from its power insufficiency.

17 Claims, 5 Drawing Sheets

SYSTEM AND METHOD FOR CONTROLLING VEHICLE DRIVE-OFF

BACKGROUND OF THE INVENTION

The present invention relates to a system and a method for controlling a vehicle during drive-off, and more particularly to a system and a method for controlling a clutch for driving the vehicle off in response to the operation of an accelerating member.

In the prior art there is known a control system for the operation of driving a vehicle off, wherein the relationship between a target position of the operation member of the clutch, for example, a release lever, and the amount of operation of an accelerator pedal is defined in advance and the semi-engaged state of the clutch is controlled in accordance with the relationship for driving the vehicle off.

For example, Japanese Patent Application Public Disclosure No. Sho 57-182530 corresponding to U.S. Pat. No. 4,488,625, discloses a conventional system of such type, in which the engaged condition of the clutch required at each instant is determined by the use of map data corresponding to a relationship of the type described above. In the conventional system the operation for engaging the clutch is ended even if the power output of the engine is insufficient for the engine load. This condition will be referred to as "power insufficiency" in this specification. The operation for engaging the clutch is restarted after the condition of power insufficiency has been overcome, whereby the occurrence of the engine failure at drive-off of the vehicle can be prevented.

However, according to the conventional system described above, the clutch operation for engagement is not carried out even if the driver depresses the acceleration pedal when power insufficiency has occurred, and after recovery from the state of power insufficiency the clutch may be operated by a stroke whose magnitude corresponds to the operation of the accelerator pedal effected during the state of power insufficiency. Consequently, in the case where power insufficiency has occurred, when the accelerator pedal is depressed and the degree of the depression thereof is maintained constant, the operation for clutch engagement is carried out with a time delay after recovery from power insufficiency no matter what constant level of depression of the accelerator pedal is maintained. This gives the driver an uncomfortable feeling.

SUMMARY OF THE INVENTION

It is therefore an object of the present invention to provide an improved system and method for controlling vehicle drive-off.

It is another object of the present invention to provide a system and method for controlling a vehicle to drive off smoothly without the occurrence of engine failure.

According to the present invention, a vehicle drive-off control system includes a determining means for determining a target clutch stroke of a clutch in accordance with the amount of operation of an accelerating member in order to drive a vehicle off. A detecting means is provided for detecting whether or not an engine is in a low engine power condition or a state of power insufficiency wherein the power output of the engine is insufficient for the engine load. The actual clutch stroke is controlled so as to follow the target clutch stroke to engage the clutch when driving the vehicle off. However, the operation for clutch engagement is ended when a low engine power condition or a state of power insufficiency is detected by the detecting means. The system further comprises a clutch stroke detecting means for producing a stroke signal indicating the actual clutch stroke and a producing means for producing correction or offset data which is indicative of the difference between the target clutch stroke and the actual clutch stroke at the time the operation condition of the engine has just recovered from the power insufficiency. The target clutch stroke is offset by an amount corresponding to the correction or offset data and the operation for clutch engagement is controlled on the basis of the corrected target amount.

Consequently, the operation for engagement is, of course, controlled in accordance with the target clutch stroke when a low engine power condition has not occurred. If power insufficiency occurs, the operation for engaging the clutch is ended. When the offset data according to the difference between the target and actual clutch stroke at the time of recovery from power insufficiency is determined, the target clutch stroke is offset by the magnitude of the offset data to obtain the corrected or offset target clutch stroke. After this, the operation for clutch engagement is controlled so as to follow the corrected target clutch stroke. Accordingly, the clutch is prevented from being engaged just after the recovery from power insufficiency no matter what the amount of operation of the accelerating member may be.

In a preferred system according to the present invention, a vehicle drive-off control system is provided with a determining means having map data corresponding to the relationship between the amount of operation of an accelerator pedal and a target clutch stroke, and target data showing the target clutch stroke produced by the determining means in response to information concerning the amount of operation of the accelerator pedal. The system further comprises a discriminating means which is responsive to an engine speed signal showing the rotational speed of the engine and determines whether or not the operation condition is one of power insufficiency. During a state of power insufficiency, the operation for clutch engagement is ended by a driving unit for adjusting the clutch stroke.

In order to correct the target clutch stroke, there is provided an offset means responsive to the outputs of the discriminating means and the determining means to produce offset data for offsetting the target clutch stroke. The offset data indicates the difference between the target clutch stroke and the actual clutch stroke just after recovery from power insufficiency. The target clutch stroke is offset by the value shown by the offset data to obtain an offset target clutch stroke. Thus, the clutch stroke is controlled on the basis of the offset target clutch stroke just after recovery from power insufficiency. As a result, when power insufficiency occurs due to an increase in the amount of operation of the clutch for engagement, the operation for clutch engagement is ended to maintain the amount of operation of the clutch at the level just before power insufficiency occurred. On the other hand, the offset target clutch stroke is equal to the actual clutch stroke just after recovery from power insufficiency no matter how far the operator depresses the accelerator pedal during the time the operation of the clutch is ceased due to power insufficiency. This ensures smooth drive-off of the vehicle at all times.

According to another aspect of the present invention, the system is provided with a change rate detecting means for detecting the rate of change in the amount of operation of the accelerating member and means for detecting whether or not the degree of power insufficiency is within a predetermined range in which it is not so large as to require the operation for engaging the clutch to be stopped. When the level of power insufficiency is within the predetermined range, the operation of the clutch is carried out in accordance with the rate of change in the amount of operation of the accelerating member instead of the target clutch stroke. If the degree of power insufficiency exceeds the predetermined range, the operation of the clutch is stopped.

For detecting whether or not the degree of power insufficiency exceeds the predetermined range, the system may comprise an additional discriminating means and the driving unit may be arranged to stop the operation for clutch engagement in response to the additional discriminating means.

Thus, when the degree of power insufficiency is within the predetermined range, the clutch stroke is controlled in accordance with the rate of the change of operation of the accelerating member. Accordingly, in this case, when, for example, the accelerating member is depressed by a small degree, the clutch is operated so as to be engaged by a correspondingly small stroke. In contrast, when the accelerating member is depressed by a large degree, the clutch is engaged by a correspondingly large stroke. Since the control operation of the clutch is carried out as described above without stopping the clutch operation in the case where the degree of power insufficiency is small, the engaging state of the clutch can be controlled in accordance with the rate of change in the depression of the accelerating member without aggravating the degree of power insufficiency.

The operation for clutch engagement is ended when the degree of power insufficiency exceeds the predetermined range, so as to prevent engine failure. However, the control operation for clutch engagement will be returned to the control state according to the rate of change in the operation of the accelerating member when the degree of power insufficiency lessens. As a result, even if a small degree of power insufficiency occurs, a pleasant drive-off feeling can be ensured.

In the control system according to the present invention, the speed and direction of the clutch control operation may be determined in accordance with the degree of power insufficiency when power insufficiency occurs during the control operation for clutch engagement. In such a control system, power insufficiency can be classified into several degrees in accordance with information concerning the rotational speed of the engine. The classification may be, for example, into the following four degrees:

(i) No power insufficiency.
(ii) A first power insufficiency condition wherein the probability of engine failure in the case of reduction in the slip rate of the clutch is low.
(iii) A second power insufficiency condition wherein the probability of engine failure in the case of reduction in the slip rate of the clutch is relatively high.
(iv) A third power insufficiency condition wherein the probability of engine failure in the case of the reduction in the slip rate of the clutch is very high.

In order to carry out the clutch control corresponding to each of the engine operation conditions stated above, the following four control modes are provided.

(a) The target clutch stroke is changed so as to engage the clutch at a relative high speed.
(b) The target clutch stroke is changed so as to engage the clutch at a relative low speed.
(c) The control operation for clutch engagement is stopped.
(d) The clutch is controlled so as to be disengaged.

For example, the control modes (a) to (d) may be used in the steps (i) to (iv), respectively. When the suitable control mode is used for the respective degree of power insufficiency, the control for vehicle drive-off can be carried out in a manner that is pleasant for the driver and does not cause engine failure.

The invention will be better understood and other objects and advantages thereof will be more apparent from the following detailed description of preferred embodiments with reference to the accompanying drawings.

DESCRIPTION OF THE PREFERRED EMBODIMENT

Figure 1:
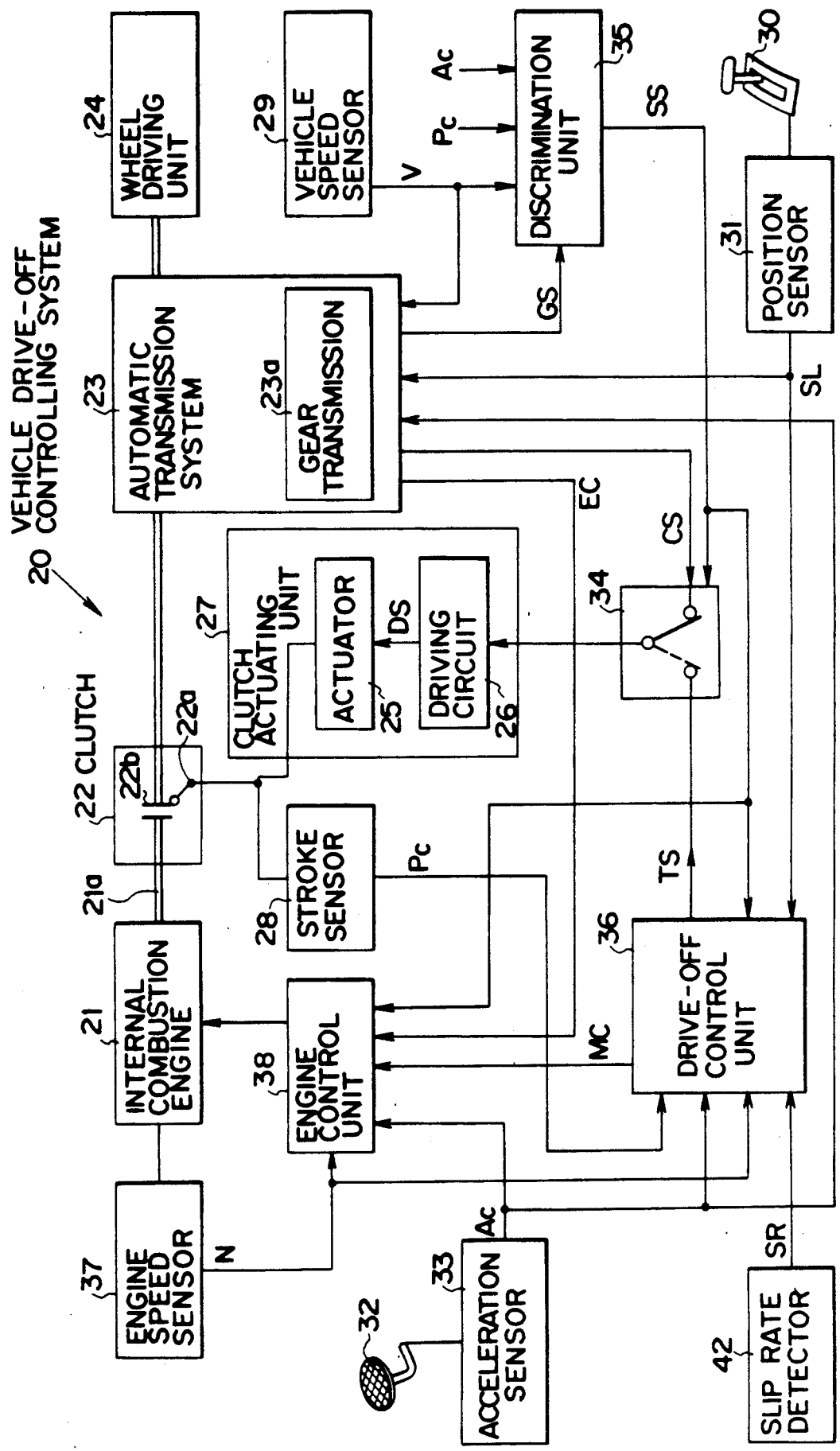
FIG. 1 is a block diagram illustrating an embodiment of a vehicle control system including a vehicle drive-off controlling system according to the present invention.

FIG. 1 is a block diagram showing a vehicle control system including a vehicle drive-off controlling system 20 according to the present invention. An internal combustion engine 21 provides driving power to a vehicle (not shown) and the rotational torque produced by the internal combustion engine 21 is transmitted from an output shaft 21a of the internal combustion engine 21 through a friction type clutch 22 and an automatic transmission system 23 using a gear transmission 23a to a wheel driving unit 24.

The clutch 22 is a friction type clutch of well-known design having a pressure plate 22b whose position is adjusted by a release lever 22a. Thus, the position of the pressure plate 22b can be positioned in accordance with the operation of the release lever 22a to obtain the desired engaged condition of the clutch. In this specification, the position of the pressure plate 22b will be referred to as the clutch stroke (which represents the degree of clutch engagement), and further the clutch stroke is defined as increasing when the pressure plate 22b moves in the direction for engaging the clutch 22. That is, the clutch stroke represents the amount of operation of the clutch.

An actuator 25 coupled with the release lever 22a operates in response to a driving signal DS generated by a driving circuit 26 to adjust the clutch stroke of the clutch 22. The actuator 25 and the driving circuit 26 together constitute a clutch actuating unit 27.

In order to detect the actual clutch stroke of the clutch 22, a stroke sensor 28 is coupled with the release lever 22a to produce a stroke signal Pc showing the actual value of the clutch stroke of the clutch 22 or the actual position of the pressure plate 22b.

Reference numeral 29 designates a vehicle speed sensor 29 for generating a vehicle speed signal V showing the vehicle speed of the vehicle powered by the internal combustion engine 21, and 31 designates a position sensor 31 for detecting the position at which the operator has set a selector 30 and producing a select signal SL showing the selected position of the selector 30. An acceleration sensor 33 coupled with an accelerator pedal 32 produces an acceleration signal Ac indicating the amount of operation of the accelerator pedal 32.

The automatic transmission system 23 is a conventional system which in response to the vehicle speed signal V, the select signal SL and the acceleration signal Ac performs automatic operations for shifting the gear transmission 23a to the target gear position suitable for the operation condition of the vehicle at each instant. The automatic transmission system 23 produces a clutch control signal CS for disengaging the clutch 22 during the performance of the gear-shifting operation of the gear transmission 23a, and the clutch control signal CS is applied through a switch 34 to the driving circuit 26. To prevent the speed of the engine 21 from becoming too high during the disengaged state of the clutch 22, the automatic transmission system 23 further produces an engine control signal EC for suppressing the rotational speed of the engine 21 to below a predetermined level during the disengaged state of clutch 22.

The vehicle drive-off controlling system 20 is provided with a discrimination unit 35 for discriminating whether or not the vehicle is in the drive-off waiting condition wherein it is permissible to perform the control operations for driving the vehicle off. This discrimination is carried out on the basis of the vehicle speed signal V, the stroke signal Pc, the acceleration signal Ac and a gearset signal GS indicating whether or not the gear transmission 23a is shifted to the desired target gear position. When the drive-off waiting condition is confirmed by the discrimination unit 35, a drive-off permission signal SS is produced by the discrimination unit 35, and is applied to a drive-off control unit 36 and to the switch 34 as a switching control signal.

The drive-off control unit 36 receives the acceleration signal Ac, the stroke signal Pc, the select signal SL, an engine speed signal N showing the rotational speed of the engine 21 and a slip rate signal SR showing the slip rate of the clutch 22 and perform the control calculations based on these signals. The engine speed signal N is generated by an engine speed sensor 37 coupled with the engine 21 and the slip rate signal SR is generated by a slip rate detector 42 which may be arranged so as to calculate the slip rate from the rotational speeds on opposite sides of the clutch 22 in a usual manner.

The drive-off control unit 36 produces a stroke control signal TS for controlling the clutch stroke of the clutch 22 for driving the vehicle off and a mode change signal MC for switching over the governor characteristic for the engine 21 on the basis of the control calculation upon the receipt of the drive-off permission signal SS. The stroke control signal TS is supplied to the switch 34 controlled by the drive-off permission signal SS and is applied to the driving circuit 26 in place of the clutch control signal CS when the drive-off waiting condition is established. In contrast, the clutch control signal CS is selected by the switch 34 to be applied to the driving circuit 26 when the drive-off waiting condition is not established.

An engine control unit 38 is responsive to the engine speed signal N, the acceleration signal Ac, the engine control signal EC, the mode change signal MC and the drive-off permission signal SS, and controls the operation of the engine 21 so as to prevent the engine 21 from assuming an excessively high speed during the drive-off operation and the gear-shifting operation, even when the clutch 22 is in the disengaged state, and to control the rotational speed of the engine in accordance with the amount of operation of the accelerator pedal 32.

In this embodiment, the drive-off control unit 36 is arranged by the use of a microcomputer system in which a prescribed control program is executed so as to control the clutch stroke of the clutch 22 to drive the vehicle off.

Figure 2:
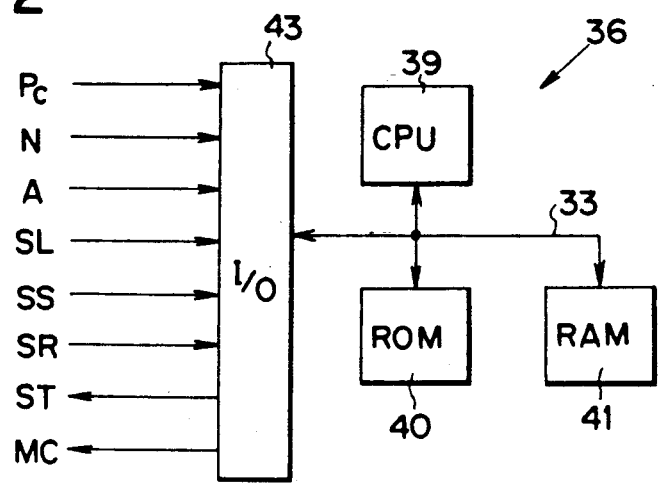
FIG. 2 is a block diagram showing the hardware of the drive-off control unit shown in FIG. 1.

As illustrated in FIG. 2, the microcomputer system employed in the drive-off control unit 36 is a well-known conventional system having a central processing unit (CPU) 39, a read-only memory (ROM) 40, a random access memory (RAM) 41, and input/output interface (I/O) 43 and a bus 33 for interconnecting these components. A control program is stored in the ROM 40 and the clutch stroke of the clutch 22 is controlled to drive the vehicle off in accordance with the control program.

Figure 3:
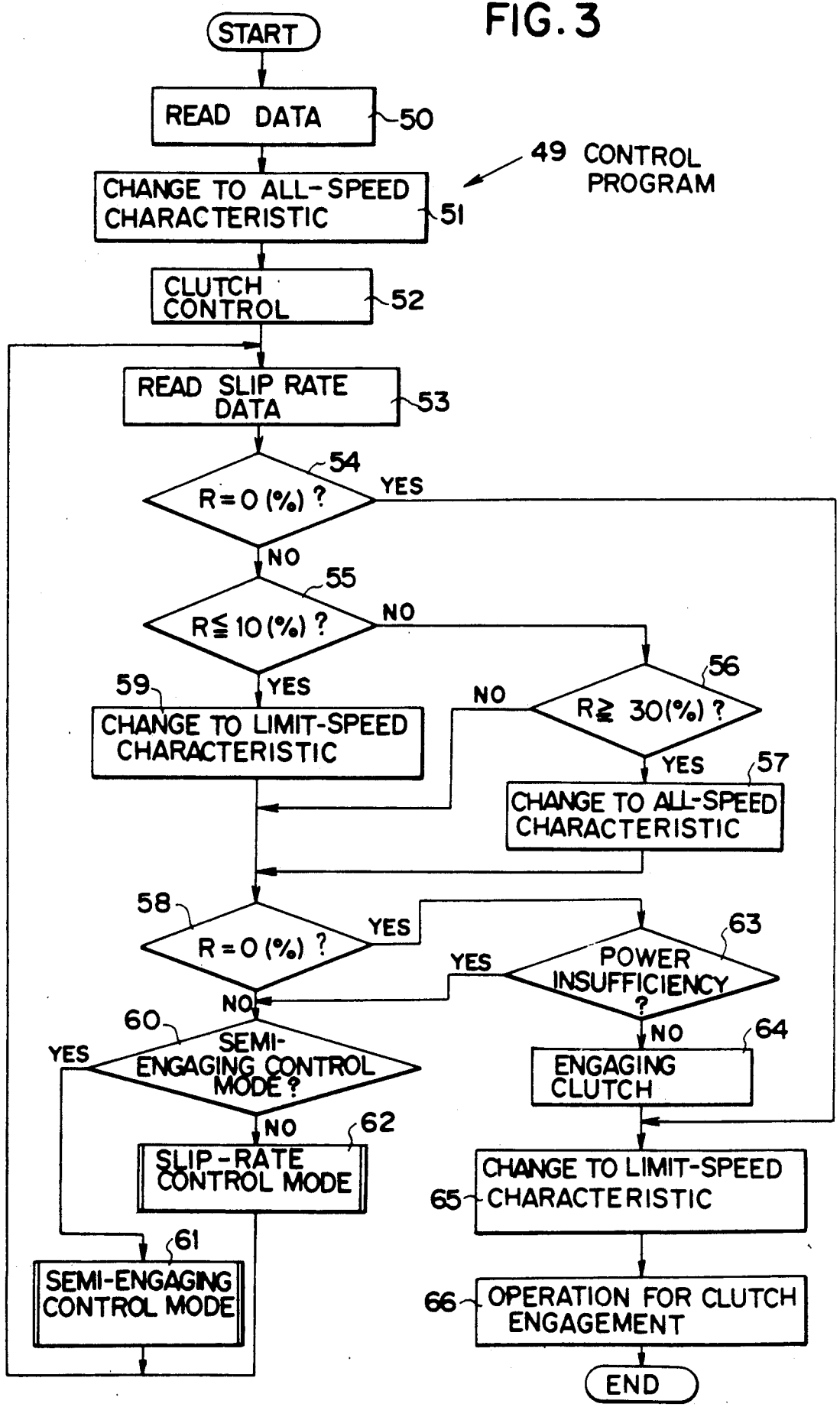
FIG. 3 is a flow chart showing the control program executed in the drive control unit.

FIG. 3 is a flow chart showing the control program 49 stored in the ROM 40. The execution of the control program 49 is started when the drive-off waiting condition is provided by the drive-off permission signal SS. After the start of execution of the control program 49, the required data is read in on the basis of the signals applied to the drive-off control unit 36 (step 50). The operation then moves to step 51 wherein the mode change signal MC is produced to change the governor characteristic in the engine control unit 38 to the all-speed characteristic. Then, the step 52 is executed to control the clutch stroke in such a way that the pressure plate 22b is moved in the direction of increased clutch stroke and is positioned at a first location just before the semi-engaged zone of the clutch 22. This operation is carried out by applying the clutch stroke value corresponding to the first location to the driving unit 26 as the stroke control signal TS. The operation then moves to step 53 wherein data corresponding to the slip rate signal SR is read in, and discrimination is made in step 54 on the basis of the value of the slip rate read in step 53 as to whether or not the clutch 22 is in the completely engaged state, that is, whether the slip rate R is equal to zero.

Since the slip rate is not zero(%) after the control operation for clutch engagement has started, the determination in step 54 becomes NO in this case and then the operation moves to step 55 wherein the discrimination is made as to whether or not the slip rate R is not more than 10(%). The determination in step 55 becomes NO when $R > 10(\%)$, and the operation moves to step 56 wherein the discrimination is made as to whether or not the slip rate R is not less than 30(%). The determination in step 56 becomes YES when $R \geq 30(\%)$, and the all-speed governor characteristic is set in step 57. After this, the operation moves to step 58. As described above, in the case of $10(\%) < R < 30(\%)$, the operation moves to step 58 without a change in the governor characteristics. The determination in step 55 becomes YES when R≦10(%), and the governor characteristic is changed to the limit-speed characteristic in step 59. After this, the operation moves to step 58. If the determination in step 54 is YES, the operation moves to step 65.

In step 58 discrimination is made as to whether or not R is zero(%). The determination is NO and the procedure moves to step 60 when R≠0. Discrimination is made in step 60 as to whether the control mode to be used for clutch engagement is a slip-rate control mode or a semi-engaging control mode.

In this embodiment, the semi-engaging control mode is selected when the following two conditions are satisfied at the same time:
(1) The increase rate of the change in the operation of the accelerator pedal 32 just after the depression of the accelerator pedal 32 is not more than a prescribed level.
(2) The amount of operation of the accelerator pedal 32 is equal to or less than 40(%).

In contrast, if at least one condition of the above two conditions is not satisfied, the slip-rate control mode is selected. The discrimination is made in step 60 as to whether or not the two conditions indicated above are satisfied, and one or the other of the control modes is selected in accordance with the result of the discrimination in step 60.

When the clutch control is in the semi-engaging control mode, the determination in step 60 becomes YES and the procedure advances to step 61 wherein the stroke of the clutch 22 is controlled in accordance with the operation of the accelerator pedal 32. On the other hand, when the clutch control is to be conducted in the slip-rate control mode, the determination in step 60 becomes NO and the procedure advances to step 62 wherein the slip rate of the clutch 22 is controlled in accordance with a predetermined time course pattern of the slip rate for engaging the clutch. The operation returns to step 53 after the execution of step 61 or 62 has been completed.

When it is discriminated in step 58 that R=0, the operation moves to step 63 wherein discrimination is made with respect to the engine 21 as to whether or not the operation is in a state of power insufficiency. Since there is the possibility of insufficient engagement of the clutch 22 when power insufficiency occurs, the determination in step 63 becomes YES and the operation moves to step 60. In contrast, since there is no possibility of insufficient engagement of the clutch 22 when power insufficiency does not occur, the operation moves to step 64 wherein the operation for clutch engagement is carried out at high speed to obtain the completely engaged state of the clutch 22. After this, the governor characteristic is changed to the limit speed characteristic which is suitable for the control during the vehicle running. Furthermore, the operation for engaging the clutch 22 is continued for an additional predetermined time period, for example, one second and the control operation for drive-off of the vehicle is terminated.

As described above, when the conditions necessary for driving the vehicle off are established, the governor characteristic is changed so that the engine speed control is performed in accordance with the all-speed characteristic, and the position of the pressure plate 22a is positioned at the first position in step 52. After this, the clutch 22 is engaged to drive the vehicle off in the semi-engaging control mode (step 61) or the slip-rate control mode (step 62).

The governor characteristic is changed to the limit-speed characteristic when the slip rate R has become not more than 10(%) (steps 55 and 59). In the case where the slip rate R again becomes more than 10(%) after once falling below 10(%), governor characteristic is not changed to the all-speed characteristic unless the slip rate R becomes equal to or more than 30(%) (steps 55, 56 and 57).

The semi-engaging control operation executed in step 61 will now be explained with reference to FIG. 4.

At first, the operation moves to step 71 wherein a set of map data for determining the target clutch stroke is selected in accordance with data corresponding to the select signal SL. In this embodiment, a plurality sets of map data are provided corresponding to the positions of the selector 30 and sets of map data are stored in the ROM 40. The target clutch stroke is determined in step 72 in response to the acceleration signal Ac in accordance with the set of map data selected in step 71, and the target clutch stroke TS corresponding to the amount of operation of the accelerator pedal 32 is determined.

Figure 5:
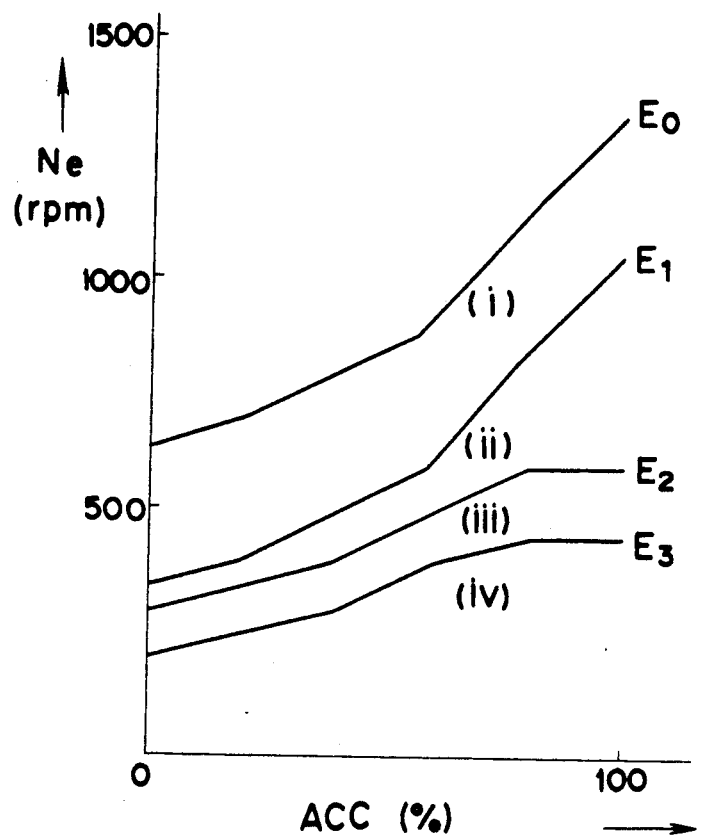
FIG. 5 is a graph showing the classification of the operation condition of the engine.

The operation then moves to step 73 wherein the operation condition of the engine 21 is checked. In this embodiment, the operation condition of the engine 21 is determined as a degree of power insufficiency on the basis of the graph shown in FIG. 5 in accordance with the operation amount ACC of the accelerator pedal 32 and the engine speed Ne of the internal combustion engine 21. The operation condition shown by the operation amount ACC and the engine speed Ne is divided into four regions (i) to (iv) by characteristic curves $E_0$, $E_1$, $E_2$ and $E_3$, and the condition of the engine 21 in the respective regions corresponds to the following states of power insufficiency.
(i) No power insufficiency.
(ii) A first power insufficiency condition wherein the probability of engine failure in the case of reduction in the slip rate of the clutch is low.
(iii) A second power insufficiency condition wherein the probability of engine failure in the case of reduction in the slip rate of the clutch is relatively high.
(iv) A third power insufficiency condition wherein the probability of engine failure in the case of the reduction in the slip rate of the clutch is very high.

Figure 4:
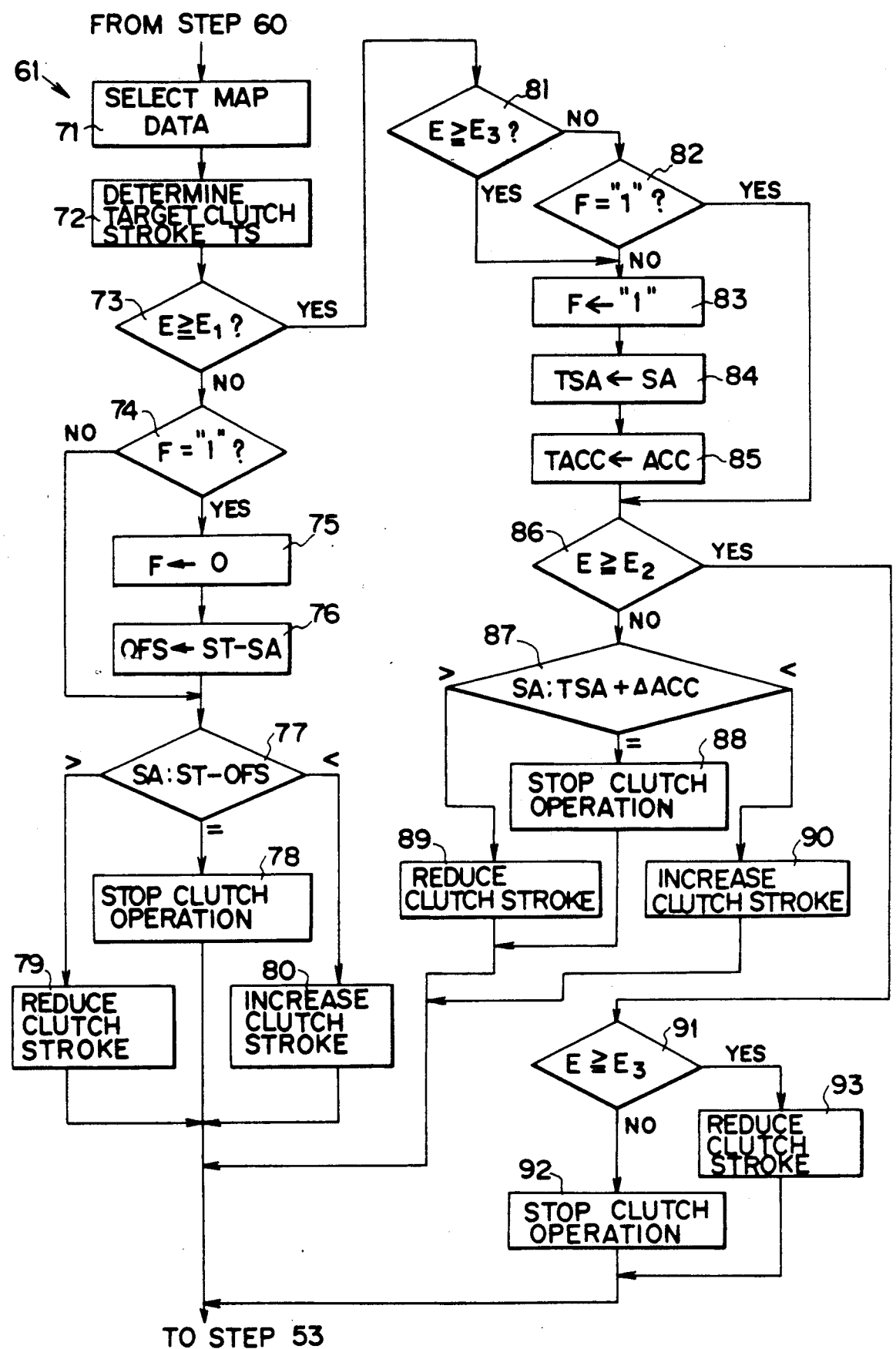
FIG. 4 is a detailed flow chart of step 61 shown in FIG. 3.

In the flow chart shown in FIG. 4, the degree of power insufficiency is considered to become larger as the engine load becomes larger. An engine load condition $E≧E_1$ means a condition corresponding to any one of (ii), (iii) or (iv), $E≧E_2$ means a condition corresponding to (iii) or (iv), $E≧E_3$ means a condition corresponding to (iv).

Returning to FIG. 4, discrimination is made in step 73 as to whether or not the engine load condition E is not less than $E_1$. If no power insufficiency has occurred, the determination in step 73 is NO and the operations from step 74 onward are executed as follows.

In step 74 discrimination is made as to whether or not a flag F indicating power insufficiency is set. When power insufficiency has not occurred previously, the flag F is not "1". Accordingly, the determination in step 74 becomes NO and the operation moves to step 77, wherein the actual clutch stroke SA is compared with the value ST-OFS. ST is the target clutch stroke obtained in step 72 and OFS is an offset value determined in step 76 as described later. The offset value OFS is zero when the Flag F is "0", so that it follows that the actual clutch stroke SA is compared with the target clutch stroke ST in this case. When SA=ST, the operation moves to step 78 wherein the operation of the clutch 22 is ended. When SA>ST, an operation for reducing the clutch stroke is carried out in step 79 to obtain the condition of SA=ST. When SA<ST, an operation for increasing the clutch stroke is carried out in step 80 to obtain the condition of SA=ST.

That is, in the case of no power insufficiency, the clutch control operation for obtaining the state of SA=ST is performed in accordance with the result of the comparison of SA and ST.

If power insufficiency occurs for some reason, the determination in step 73 is YES and the operation moves to step 81, wherein discrimination is made as to whether or not $E \geq E_3$. The determination in step 81 becomes NO when the engine 21 is operating in the region (ii) or (iii), so that the operation moves to step 82 wherein discrimination is made as to whether or not the flag F is set or "1". The determination in step 82 becomes NO when the flag F is cleared or "0", and the flag F is set in step 83. In step 84 the magnitude of the actual clutch stroke SA is set to a variable TSA, and the operation moves to step 85 in which the magnitude of the operation amount ACC is set to variable TACC. After this, discrimination is made in step 86 as to whether or not $E \geq E_2$.

On the other hand, in the case where the flag F has already been set, the execution of steps 83 to 85 is omitted, since the determination in step 82 is YES. In addition, when the determination in step 81 is YES, the operation moves to step 83 without execution of step 82.

The determination in step 86 becomes NO when the engine 21 is operating in the region (ii), and the operation moves to step 87, in which the difference $\Delta ACC$ (=ACC−TACC) is calculated on the basis of the operation amount ACC at this instant and the value of TACC set in step 85. Furthermore, the sum (TSA+$\Delta ACC$) is calculated on the basis of the $\Delta ACC$ obtained above and the value of TSA set in step 84, and the actual clutch stroke SA is compared with the sum (TSA+$\Delta ACC$). As the difference $\Delta ACC$ corresponds to the rate of change in the amount of operation of the accelerator pedal 33, the determination in step 87 depends upon how the amount of operation of the accelerator pedal 32 changes, irrespective of the target clutch stroke ST.

Since SA is substantially equal to TSA in step 87, the operation moves to step 88 because $\Delta ACC=0$ if the amount of operation of the accelerator pedal 32 does not change. In this case, the operation for clutch engagement is ended. When the sign of $\Delta ACC$ becomes negative because of a decrease in the operation amount ACC, step 89 is executed to reduce the clutch stroke. In contrast, when the sign of $\Delta ACC$ becomes positive due to an increase in the operation amount ACC by depression of the accelerator pedal 32, step 90 is executed to increase the clutch stroke. That is, the clutch stroke is controlled in accordance with the change in the operation amount ACC. After this, the operation moves to step 53.

The determination in step 86 becomes YES when the engine 21 is operating in the region (iii) or (iv), and the operation moves to step 91 wherein discrimination is made as to whether or not $E \geq E_3$. The determination in step 91 becomes NO when the engine 21 is operating in the region (iii), and the operation for clutch engagement is ended. On the other hand, the determination in step 91 becomes YES when the engine 21 is operating in the region (iv), and the clutch 22 is operated so as to reduce the clutch stroke.

Upon recovery from power insufficiency as a result of the above described control operations, since the determination in step 73 of the preceding program cycle becomes NO, step 74 is executed. The determination in step 74 becomes YES under the circumstances described above and the flag F is cleared in step 75. After this, the operation moves to step 76, wherein the difference between the target clutch stroke ST and the actual clutch stroke SA is set as the offset value OFS. Therefore, the content of ST-OFS is equal to SA in step 77 and SA becomes equal to ST-OFS. As a result, the operation for clutch engagement is ceased in step 78 so that the actual clutch stroke does not vary.

Figure 6:
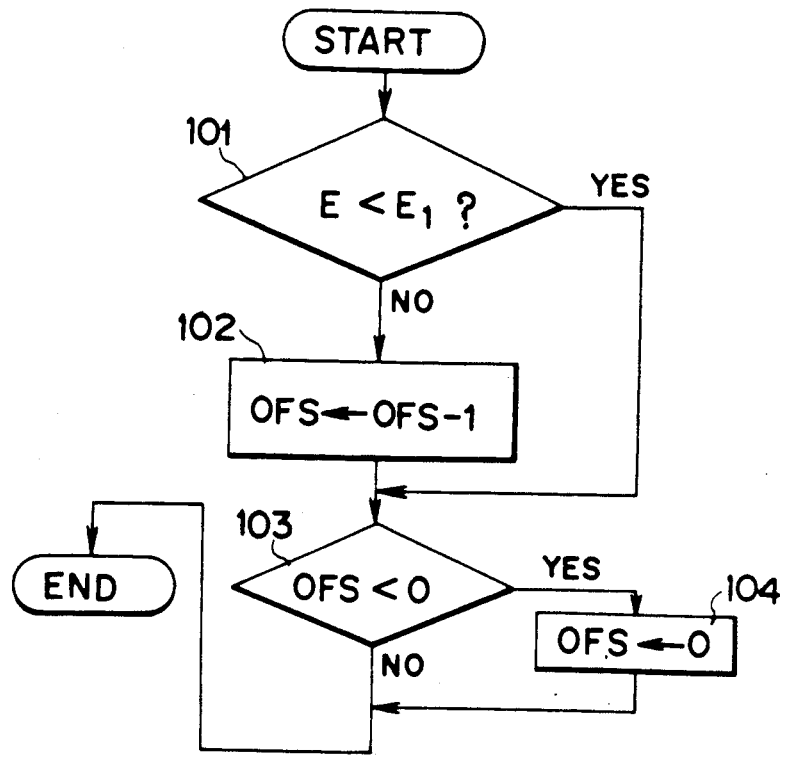
FIG. 6 is a flow chart showing a processing program for processing the offset data.

FIG. 6 is a flow chart of a processing program for calculating the offset value OFS. The processing program shown in FIG. 6 is triggered for execution at regular time intervals. First, discrimination is made in step 101 as to whether or not power insufficiency has occurred, or $E < E_1$. The determination in step 101 becomes NO when power insufficiency has not occurred, and the operation moves to step 102 wherein the offset value OFS is decremented by one. Then, the operation moves to step 103 without execution of step 102 when the determination of step 101 is YES.

Discrimination is made in step 103 as to whether or not the offset value OFS is less than zero, and when OFS is less than 0 the operation moves to step 104, wherein the offset value OFS is made zero. Thus, the execution of the processing program is terminated. The execution of the processing program is terminated without the execution of step 104 when OFS$\geq$0.

As will be understood from the above description, the offset value OFS is decremented by one once every predetermined time period when power insufficiency has not occurred, and the offset value OFS is maintained at zero after the offset value OFS has reached zero.

Thus, the offset value OFS used in step 77 is gradually decreased once every execution of the processing program and finally becomes zero. Therefore, the offset target clutch stroke (ST-OFS) becomes greater with the passage of time.

As a result, in the control mode wherein the actual clutch stroke is controlled so as to follow the target clutch stroke according to the amount of operation of the accelerator pedal 32 after recovery from power insufficiency, even if the actual clutch stroke is different from the target clutch stroke, the difference therebetween becomes gradually smaller with the passage of time. As described above, since the difference is not eliminated all at one time upon recovery from power insufficiency, the driver does not experience any uncomfortable feeling.

Furthermore, in the case of a slight power insufficiency, since the stroke of the clutch 22 is controlled in accordance with the magnitude of $\Delta ACC$ without stopping the clutch operation in accordance with the operation of steps 84 to 90, as compared with the conventional system in which the clutch operation for engaging is not effected when power insufficiency has occurred, the feeling at drive-off of the vehicle is dramatically improved. Furthermore, since the operation for clutch engagement is related to the change in the amount of operation of the accelerator pedal, the operation of the accelerator pedal is matched to the change in the slip rate of the clutch, whereby an improved feeling at drive-off can be obtained.

Still further, since the power insufficiency condition is classified into a plurality grades and the clutch operation for engagement is performed in accordance with the grade at that time, the clutch operation for driving the vehicle off can be attained effectively without degrading the feeling at drive-off.

Figure 7:
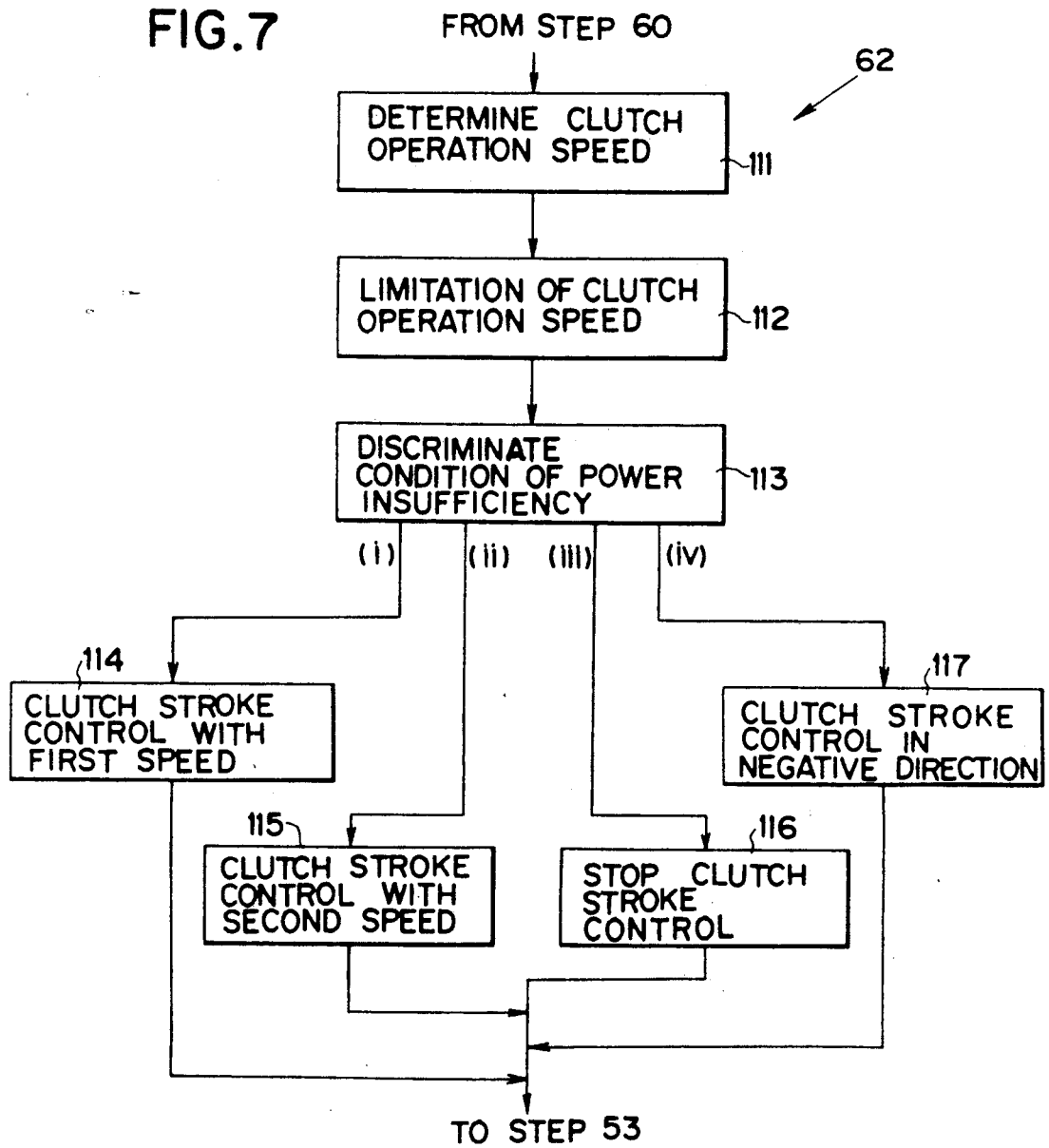
FIG. 7 is a detailed flow chart of step 62 shown in FIG. 3.

FIG. 7 is a detailed flow chart of step 62 of FIG. 3. In step 111, the operation speed for engaging the clutch 22 is determined on the basis of the actual slip rate obtained in step 53 of FIG. 3 and the target slip rate determined in accordance with a predetermined target slip rate characteristic. Then in step 112 the resulting operation speed is compared with a maximum speed determined in accordance with the amount of operation of the accelerator pedal 32 to limit the operation speed below the maximum speed.

Then the operation moves to step 113 wherein the operation condition of the engine 21 is discriminated in the same way as that described previously in conjunction with FIG. 5. That is, the discrimination is made in step 113 as to in which region among the regions (i) to (iv) shown in FIG. 5 the engine 21 is operating. When the engine 21 is operating in the region (i) without power insufficiency, the operation moves to step 114 wherein the clutch operation for engagement is performed at a first speed determined in step 112. When the engine 21 is operating in the region (ii), the operation moves to step 115 wherein the clutch operation for engagement is performed at a second speed which is lower speed than the first speed. The second speed may be determined by multiplying the first speed by a prescribed coefficient (<1).

When the engine 21 is operating in the region (iii), the operation moves to step 116 wherein the operation for controlling the clutch stroke of the clutch 22 is ended. When the engine 21 is operating in the region (iv), the operation moves to step 117 wherein the control operation for disengaging the clutch 22 is performed to the power insufficiency.

As a result, appropriate control can be performed corresponding to the degree of power insufficiency, whereby effective clutch control operation can be realized without the degrading of the feeling at drive-off.

We claim:

1. A drive-off control system for a vehicle powered by an internal combustion engine whose rotational output is transmitted through a clutch to a wheel driving assembly, said system comprising:
   means for detecting the operation of an accelerating member;
   means for determining a target clutch stroke of the clutch in response to the level of operation of said accelerating member in order to drive the vehicle off;
   means for discriminating whether or not the engine is in a condition of power insufficiency and whether said engine has subsequently recovered from said condition;
   means for detecting an actual clutch stroke of the clutch;
   means for controlling the clutch to provide an actual clutch stroke which follows the target clutch stroke for driving the vehicle off, said means for controlling being inhibited by a power insufficiency signal from said means for discriminating;
   means for establishing a clutch stroke which will result in recovery of said engine from said power insufficiency;
   means for producing correction data based on the difference between the target clutch stroke and the actual clutch stroke at a time the engine has recovered from power insufficiency, and in response to said discriminating means;
   a correcting means for correcting the target clutch stroke by an amount corresponding to the correction data to obtain a corrected target clutch stroke; and
   means for providing the corrected target clutch stroke to said control means after the recovery from power insufficiency, such that the clutch engagement is controlled to follow the corrected target clutch stroke following said recovery.

2. A system as claimed in claim 1, wherein the correction data has an initial value equal to said difference and the value of the correction data is gradually reduced to zero with the passage of time.

3. A system as claimed in claim 2, wherein the reduction of the value of the correction data is inhibited when power insufficiency has occurred.

4. A system as claimed in claim 1, wherein said control means has a comparing means for comparing the actual clutch stroke, with a given target stroke and the clutch stroke is controlled in accordance with the result of the comparison by the comparing means.

5. A drive-off control system for a vehicle powered by an internal combustion engine whose rotational output is transmitted through a clutch to a wheel driving assembly, said system comprising:
   means for detecting an amount of operation of an accelerating member;
   a determining means for determining a target clutch stroke of the clutch in response to the amount of operation of an accelerating member in order to drive the vehicle off;
   a first discriminating means for discriminating whether or not the engine is in a condition of power insufficiency;
   a first control means responsive to said determining means for controlling the clutch in such a way that an actual clutch stroke follows the target clutch stroke for driving the vehicle off when said first discriminating means indicates a power insufficiency does not occur;
   a change detecting means for detecting a change in the amount of operation of the accelerating member;
   a second control means responsive to said change detecting means for controlling the clutch stroke of the clutch in accordance with the change in the amount of operation of the accelerating member;
   a second discriminating means for discriminating whether or not the level of power insufficiency is within a predetermined range; and,
   means responsive to said second discriminating means for selecting said second control means instead of said first control means to control the clutch to obtain a clutch stroke which permits recovery from said power insufficiency when the level of power insufficiency is within the predetermined range.

6. A system as claimed in claim 5, wherein the predetermined range is set below a prescribed level of power insufficiency.

7. A system as claimed in claim 6, wherein the prescribed level is determined at a level wherein the probability of engine failure in the case of reduction in the slip rate of the clutch is relatively high.

8. A system as claimed in claim 6, wherein the control operation for clutch engagement is stopped when the level of power insufficiency exceeds the prescribed level.

9. A system as claimed in claim 5 further comprising a stroke detecting means for detecting an actual clutch stroke of the clutch; means for producing correction data based on the difference between the target clutch stroke and the actual clutch stroke detected by said stroke detecting means at a time the operation condition of the engine has recovered from power insufficiency, and in response to said first discriminating means; a correcting means for correcting the target clutch stroke by an amount corresponding to the correction data to obtain a corrected target clutch stroke instead of the target clutch stroke to said first control means after the recovery from power insufficiency, such that an operation of clutch engagement is controlled so as to follow the corrected target clutch stroke.

10. A system as claimed in claim 9, wherein an initial value of the correction data is equal to the difference between the actual and target clutch stroke and the value of the correction data is gradually reduced to zero with the passage of time.

11. A drive-off control method for controlling a clutch associated with an internal combustion engine for a vehicle in order to drive the vehicle off, said method comprising the steps of:
discriminating one of multiple levels of engine power insufficiency from the engine rotational speed;
determining control data for controlling the clutch stroke for driving the vehicle off in response to the discriminated level of power insufficiency; and
controlling a clutch stroke of the clutch in accordance with the control data.

12. A method as claimed in claim 11, wherein the level of power insufficiency is determined in response to a rotational speed of the engine and the amount of operation of an accelerating member.

13. A method as claimed in claim 11, wherein the control data includes data relating to a direction of operation of the clutch, and an operation speed of the clutch.

14. A drive-off control system for a vehicle powered by an internal combustion engine coupled through a clutch to a wheel driving assembly, said system comprising:
means for detecting the operation of an accelerator member of said internal combustion engine;
means for detecting one of a plurality of levels of power insufficiency experienced by said internal combustion engine; and,
control means for controlling said clutch in a semi-engaging control mode when a condition of power inefficiency is experienced, said control means controlling a clutch stroke of said clutch based on the detected level of power insufficiency according to the following:
(a) if the level of power insufficiency exceeds a third level which represents a high probability of engine failure, clutch operation is ended;
(b) if the level of power insufficiency exceeds a second level representing a lower level of probability of engine failure than said third level, the clutch stroke is controlled in accordance with the operation of said accelerator member; and,
(c) if the level of power inefficiency exceeds a first level of insufficiency representing a lower probability of engine failure than said second level, the clutch stroke is controlled according to a target clutch stroke.

15. The drive-off control system according to claim 14 further comprising means for detecting a slip rate for said clutch, and wherein said control means operates in said semi-engaging mode in response to either an indication by said means for detecting a condition of power insufficiency or a clutch slip rate which is above a predetermined rate.

16. The drive-off control system according to claim 14 wherein said control means enters said semi-engaging control mode when the accelerator member operation is within predetermined limits.

17. The drive-off control system according to claim 14 wherein said control means selects an initial clutch stroke following a recovery from a condition of power insufficiency identified by said third or second levels of power insufficiency, based upon the most recent measurement of clutch stroke upon entering said recovery, and subsequently modifies over time said most recent clutch stroke measurement to obtain said target clutch stroke.

* * * * *